Patented Mar. 12, 1935

1,993,932

UNITED STATES PATENT OFFICE 1,993,932

BEVERAGE AND INGREDIENTS THEREFOR

Glenn H. Joseph, Ontario, and Robert D. Nedvidek, Pomona, Calif., assignors to California Fruit Growers Exchange, Los Angeles, Calif., a corporation of California No Drawing. Application March 2, 1931, Serial No. 519,682

15 Claims. (Cl. 99—11)

Our invention relates to beverages and ingredients therefor, especially those which contain a noticeable proportion of relatively insoluble solids, and it has particular reference to beverages prepared with products derived from the fruit of the cacao bean.

It is a well known fact that in the use of these products for the preparation of beverages, sirups, and other similar food products, the user constantly encounters the difficulty that fibrous and other relatively insoluble matter will settle out, leaving a decidedly non-homogeneous resultant product. An example of this met with in every day experience is the cocoa beverage prepared from time to time as desired in homes, in hotels, restaurants, etc. It is well known that in beverages of this type, such as those prepared from cocoa, chocolate, and the like, there is found at the bottom of the cup or other container a considerable amount of relatively insoluble material that has settled out. This last portion is so much higher in insoluble cocoa or chocolate solids that it is commonly left in the cup because it is found objectionable by so many people. It is obvious that in such cases a more uniform distribution of the chocolate or cocoa solids would give a more pleasing beverage with a full, satisfying taste throughout.

We have now discovered that by incorporating with products derived from the fruit of the cacao bean a suitable proportion of pectin, under proper conditions of hydrogen ion activity, it is possible to overcome the difficulties mentioned above, and also to achieve certain additional useful and desirable results. Accordingly it is an object of our invention to provide a beverage of the character hereinafter described which shall be uniform in character and in which the solid particles shall remain in substantially uniform suspension for a much longer time than is the case with similar beverages as heretofore prepared, in which the characteristic of uniformity of the entire volume is of only very brief duration.

Another object is to make a beverage which shall be much smoother than similar beverages as now prepared.

Another object is to make a beverage which shall be somewhat more viscous (the viscosity varying with the proportions of pectin used, as hereinafter set forth), and thus shall have a better consistency or "body" than similar beverages as heretofore known.

Another object is to prepare a beverage in which the natural flavor shall be more fully brought out.

Another object is to retard or even wholly prevent the formation of scum, e. g., in the case of hot cocoa or chocolate made with milk.

Still another object is to cause bubbles of the gas to be more uniformly distributed and to be retained for a much longer period, in cases where the beverage is aerated or carbonated.

Another object is to disclose and provide a means and method by which, under properly controlled conditions of hydrogen ion activity, pectin may be utilized with products derived from the fruit of the cacao bean to produce the desirable results herein set forth.

Other objects will be in part obvious and in part will appear from a contemplation of the invention as set forth herein and in the appended claims.

We have discovered that beverages made up with such materials as cocoa or chocolate are greatly improved by the addition of pectin in suitable proportions and that this is true whether the beverage is made hot or cold, aerated or not aerated (or carbonated) and with or without sugar and/or flavoring such as vanilla and the like.

In a preferred form of the invention dried powdered pectin such, e. g., as results from the process described in United States Patent No. 1,497,884, or which may be made by any other suitable process, is mixed thoroughly, under proper pH conditions, with powdered chocolate or cocoa with or without sugar and with or without additional flavoring matter such as vanilla. Preferably the finished product should contain about 10% of pectin when either chocolate or cocoa is used. A sweeter product may be made by the addition of sugar, which will then contain a smaller percentage of pectin depending on the amount of sugar used, though the percentage of pectin to the chocolate or cocoa used will still be maintained. These proportions apply equally to cocoa or chocolate.

In connection with the proportion of 10%, which of course is not to be taken as the only desirable percentage but is typical of the proportion which will give good results, we refer to a pectin preparation of the grade known as 160, that is one part of pectin preparation will carry 160 parts by weight of sugar in making standard jelly. If other grades of pectin are used, as 100 grade or 240 grade, then a greater or less proportion of pectin preparation will be used to secure the same results in the finished product.

While it seems to be the case that the ability of pectin to hold insoluble solids such as those of cocoa in suspension, runs approximately parallel to the jelly grade of the pectin it is recognized that this is not necessarily the case, but jelly grade has been used as a means of indicating the relative value of pectin for the purposes described in this invention since at the present time no other satisfactory quantitative method of describing different grades of pectin is available. It is to be expected that eventually methods of measurement, based upon the particular function of pectin utilized herein, will be worked out.

As will be understood, the mixture above described can be used in making up beverages in any conventional or desirable manner. Dried milk or malted milk may be mixed with the powder, or any other suitable dried powdered ingredient may be mixed therewith in obvious manner, and other ingredients may be added in obvious ways according to the taste or fancy of the user.

It will be understood also, that hard cakes or tablets, etc., may be made according to our invention and that we do not limit ourselves to the powdered or any other particular form, neither do we believe that the applicability of our invention is limited to any specific proportions, formulas, or ingredients.

In the utilization of our invention we have discovered that there is a certain limit of pH above which pectin-cocoa mixtures, and the like, are not, apparently, commercially satisfactory.

In order fully to explain this phase of our invention we will limit ourselves to cocoa powders for the purpose of illustration, but it is to be understood that insofar as the scope of our invention is concerned, this is illustrative only, and not limiting. Cocoa and chocolate which are produced from ground cacao beans are preferred for use in the beverage but other granular, flaky, etc., preparations which when mixed with liquids remain in suspension in a wholly or partly undissolved state, such as broma, are within the contemplation of our invention.

Various powdered cocoa products found on the market vary rather widely in their active acidity. The same is true of other products derived from the fruit of the cacao bean product. It is obvious that if products of varying pH be each mixed with equal proportions of pectin from the same lot, the resulting mixtures will vary in pH. This latter variation will correspond in a general way to the former, although it may not be identical. Moreover, since varying lots of pectin may vary slightly in pH, and particularly since pectins prepared by differing processes will differ in pH, it will be obvious that mixtures of the same cocoa product with varying pectins will result in final mixtures which probably will not be the same in pH. For these reasons it is perhaps impossible to say that a certain cocoa product is too high in pH to produce satisfactory results when mixed with any pectin. We have discovered, however, that there is a rather definite upper limit of pH for the final mixtures, above which the useful results achieved by the incorporation of pectin with a cacao bean product became markedly less. This upper limit is about pH 5.5.

It appears from our tests of various cocoas that those produced by the so-called Dutch process or by any process in which the product is treated with an alkali have a pH too high to enable one to obtain a satisfactory result in the use of this invention, but natural process cocoas on the other hand have a lower pH and give highly satisfactory results when so employed.

We should explain that the pH values given herein were determined in experimental work as follows: A sirup was prepared from 278 ml. of distilled water, 283 g. of cane sugar, and 55.5 g. of the pectin-cocoa or other mixture. The pH of this sirup was determined by means of the hydrogen electrode. Accordingly it will be understood that when we speak of the pH of a given product or mixture we refer to the pH which a sirup made and determined in the above manner will have. The pH of liquid products is determined on the liquid as such.

In order to set forth the significance of this limit we will give certain specific examples of satisfactory and unsatisfactory products. Three different cocoa products which we obtained on the market and mixed with 10% of pectin from the same lot resulted in mixtures of which the first had a pH value of 4.8, the second 5.7, and third 6.5. The first was eminently satisfactory in every respect and had all the desirable and improved characteristics set forth hereinabove. The second seemed to be on or perhaps just slightly beyond the border line where the improved characteristics produced by the addition of pectin begin to become markedly less noticeable. The third was distinctly unsatisfactory.

We may remark that from a practical standpoint there would not seem to be any lower limit of pH in the application of our invention since we believe that the use of our invention would improve the physical characteristics of these products even down into those pH ranges where the high acidity would make a beverage undesirable.

In this specification and the appended claims we use the term "cocoa" to include commercial cocoa fibers, cocoa shells, broma and chocolate and any equivalent edible solid material suitable for the beverage herein referred to.

We should also explain that where an aqueous beverage is to be prepared and marketed as such it seems preferable for the beverage to have a pH value similar to those set forth hereinabove, but it is to be understood that our preferred mixture of pectin and cocoa material, having pH values as set forth, functions very satisfactorily in ordinary milk-cocoa beverages, and the like.

Having thus fully described our invention and the manner in which the same is to be employed, we claim as our invention and desire to secure by Letters Patent the following:

We claim:

1. A composition for use in making beverages comprising as essential elements thereof cocoa composition and pectin, the composition having a pH not substantially above 5.5.

2. A beverage containing a liquid vehicle or carrier, a cocoa composition in finely divided form carried thereby, and pectin, the latter protecting the cocoa particles from precipitation and the pH of the beverage being 5.5 or less.

3. A beverage base comprising a mixture of a cacao bean product, pectin, and sugar, the pH of the mixture being 5.5 or less.

4. A sirup comprising a cacao bean product, pectin, sugar, and an aqueous material, the pH of the sirup being not greater than 5.5.

5. A beverage comprising a liquid vehicle, pectin, and finely divided cacao bean product, the pH of the beverage being less than 5.7.

6. A cocoa beverage comprising milk, cocoa and a comparatively small quantity of pectin, the beverage being made with a cocoa-pectin composition having a pH not substantially greater than 5.5.

7. A composition suitable for use in making beverages comprising essentially an intimate mixture of cocoa and pectin, the pH of the composition being less than 5.7.

8. A composition suitable for use in making beverages comprising essentially an intimate mixture of chocolate and pectin, the pH of the composition being less than 5.7.

9. As a method of improving a beverage which normally develops a scum, the step of adding pectin to the beverage.

10. A beverage containing ingredients such that a scum normally is formed thereon, said beverage having pectin added thereto to prevent or substantially reduce the formation of the scum.

11. A beverage containing ingredients that form foam upon agitation, said beverage having pectin added thereto for increasing the life of the foam.

12. A beverage product in finely divided form comprising as essential elements thereof natural process cocoa and pectin, said pectin being present in quantities sufficient to maintain solids present in said beverage product in suspension for an appreciable time after said beverage product is dispersed in an aqueous liquid.

13. A sirup comprising cocoa in finely divided form, pectin, sugar and an aqueous material, the pectin being present in quantity sufficient to prevent solids present from separating for an appreciable time after the sirup is dispersed in an aqueous liquid serving as a beverage.

14. A beverage comprising an aqueous solution and suspension of finely divided natural process cocoa and pectin whereby solids present in the beverage are prevented for an appreciable time from agglomerating and separating from the aqueous phase.

15. A cocoa beverage comprising milk, finely divided natural process cocoa, and a comparatively small quantity of pectin whereby solids present in the beverage are prevented for an appreciable time from agglomerating and separating from the aqueous phase.

GLENN H. JOSEPH.
ROBERT D. NEDVIDEK.